June 9, 1953 — H. E. SWANSON — 2,641,339
BRAKE CONSTRUCTION
Filed March 18, 1948 — 2 Sheets-Sheet 1
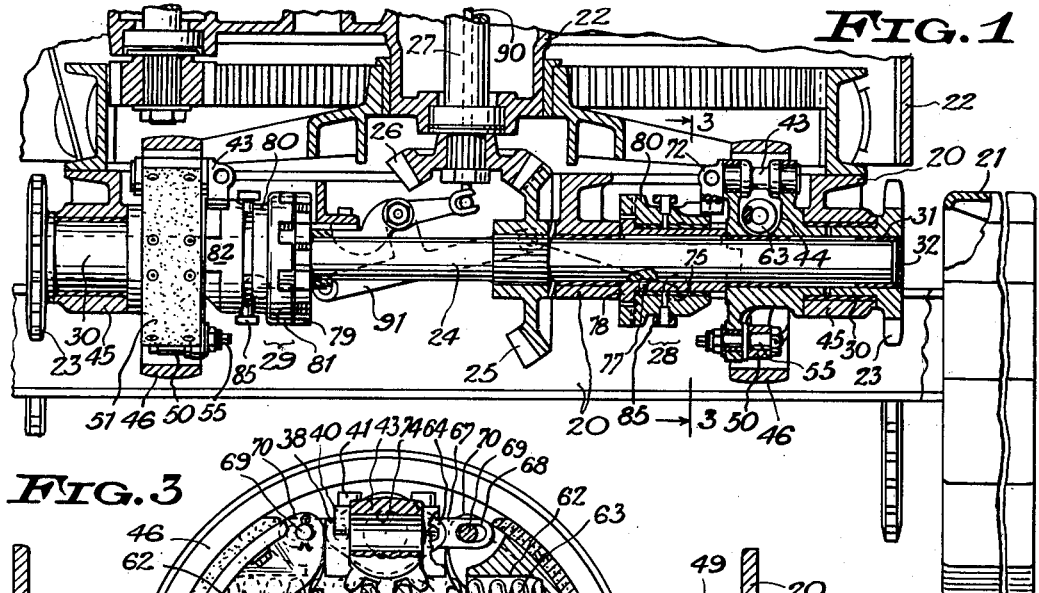
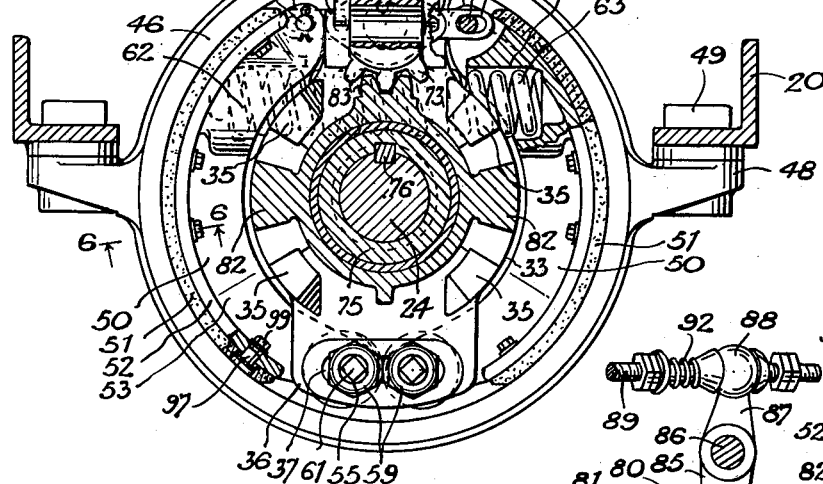
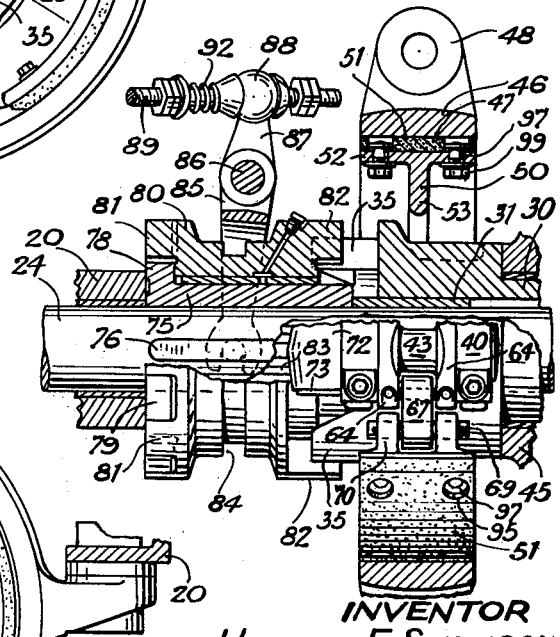
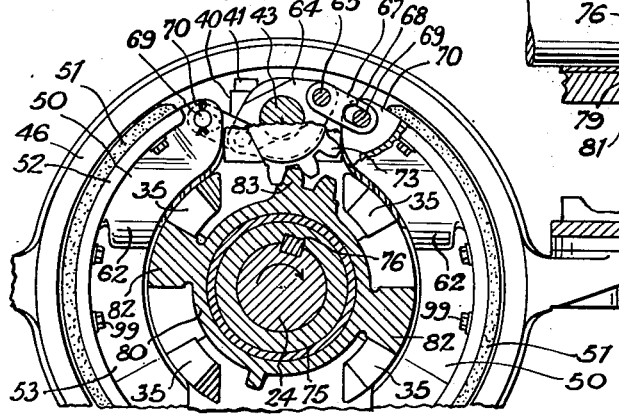
INVENTOR
HILBERT E. SWANSON
BY Christopher L. Waal
ATTORNEY

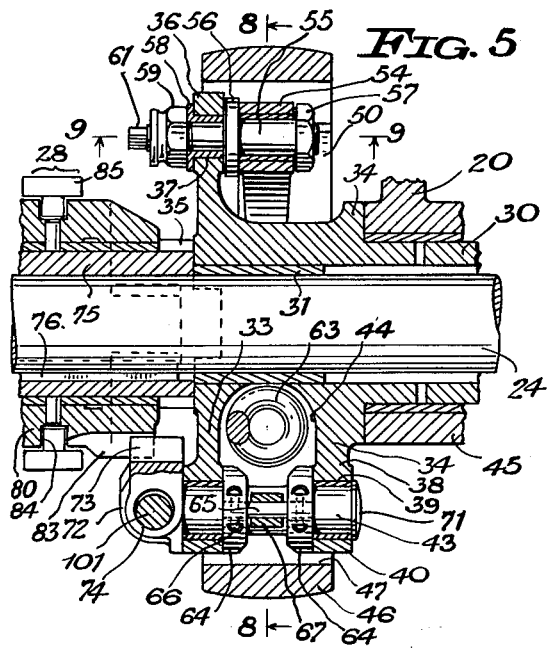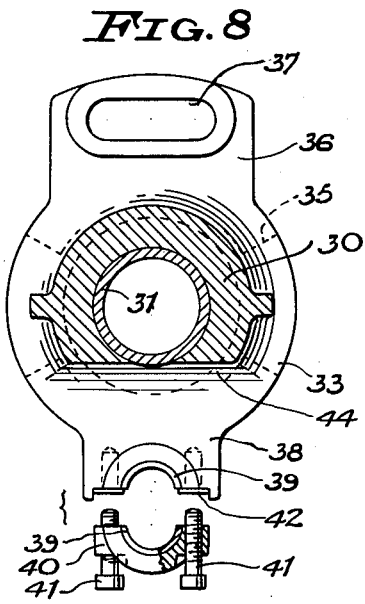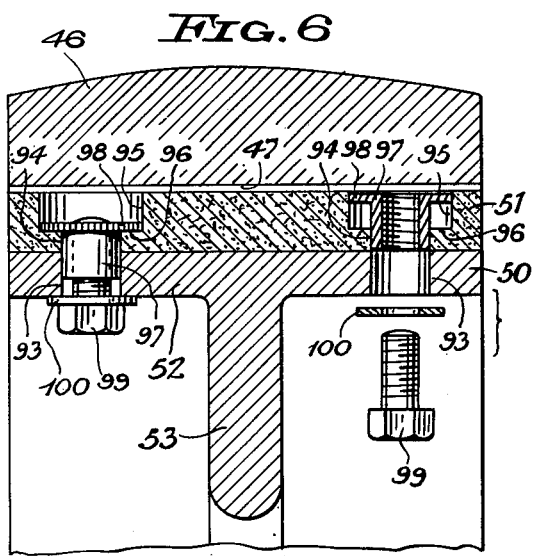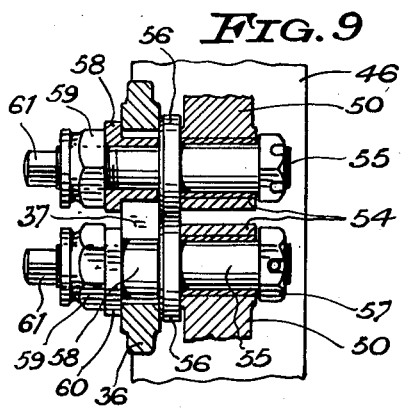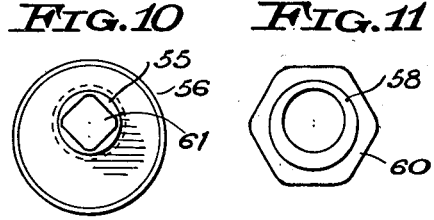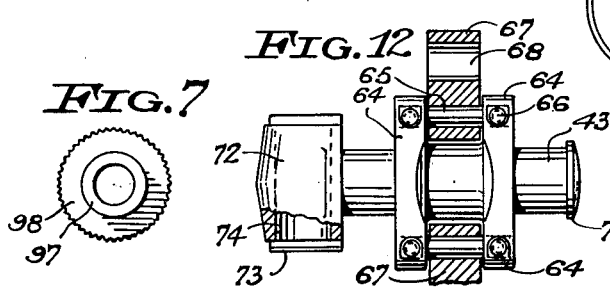

Patented June 9, 1953

2,641,339

UNITED STATES PATENT OFFICE 2,641,339

BRAKE CONSTRUCTION

Hilbert E. Swanson, Milwaukee, Wis., assignor to Unit Crane & Shovel Corp., West Allis, Wis., a corporation of Delaware Application March 18, 1948, Serial No. 15,680

7 Claims. (Cl. 188—166)

The present invention relates to brake construction and the like, and is particularly adapted for use in a driving and braking mechanism, as for power shovels and other machines, although certain features of the invention are of general application to brakes and clutches.

An object of the invention is to provide a brake construction or the like having simple, reliable and easily adjusted means for properly positioning braking or friction members thereof and for taking up wear.

Another object is to provide improved means for releasing the friction members from frictional engagement.

The invention further consists in the several features hereinafter described and claimed.

In the accompanying drawings,

Fig. 1 is a transverse sectional elevational view of a power shovel chassis or carriage, taken generally at the swing axis of the shovel and showing brake construction embodying the invention;

Fig. 2 is a fragmentary sectional view of one of the brake units, taken generally in a horizontal axial plane;

Fig. 3 is a sectional elevation of one of the brake units, taken generally on the line 3—3 of Fig. 1;

Fig. 4 is a view generally similar to Fig. 3, but showing the brake unit in released position;

Fig. 5 is a fragmentary sectional elevational view of the right-hand brake unit of Fig. 1, but at a larger scale;

Fig. 6 is a detail sectional view of a brake shoe and cooperating brake drum, taken generally on the line 6—6 of Fig. 3, and showing one of the lining-securing devices in released position;

Fig. 7 is a detail view of a lining-securing nut;

Fig. 8 is a detail sectional view of a brake carrier, taken generally on the line 8—8 of Fig. 5;

Fig. 9 is a detail sectional view of a brake shoe mounting, taken generally on the line 9—9 of Fig. 5;

Fig. 10 is an end view of a brake shoe pivot bolt;

Fig. 11 is an end view of a brake-adjusting eccentric bushing, and

Fig. 12 is a detail view of a brake-releasing device, parts of links thereof being shown in section.

The construction of the invention is adapted for use in various machines, but for purposes of disclosure is here shown and described as incorporated in the traction means of a power shovel or crane, such as the general type disclosed in United States Patent 2,318,286 to Brey and Swanson for Traction Brake, issued May 4, 1943. This machine has a chassis or carriage including a lower frame 20 and a pair of crawlers or caterpillar treads 21 at opposite sides, one being shown. Rotatably mounted on the lower frame 20 to swing about a vertical axis is the usual upper or revolving frame 22, as in the above-mentioned Patent 2,318,286.

Each crawler is adapted to be driven independently by means including a drive element 23 in the form of a sprocket from a horizontal drive shaft 24 extending transversely of, and journalled in, the lower frame 20, there being a drive element 23 at each end of the shaft. Fast on an intermediate portion of the shaft 24 is a bevel gear 25 meshing with a bevel pinion 26 secured to the lower end of a suitably driven vertical shaft 27 journalled in the upper frame to rotate about the swing axis.

In crawler traction means, provision must be made to drive both crawlers either forwardly or backwardly simultaneously, or to drive one crawler only in either direction while the other is held stationary. To hold one of the crawlers stationary while the other crawlers is operating, brake devices have been employed. In the above Patent 2,318,286, there is disclosed automatically operable brake mechanism for this purpose. The latter brake mechanism is normally engaged, so as to prevent possible runaway of the shovel, but is automatically released as an incident to the application of power for driving the shovel.

Operatively interposed between the drive shaft 24 and one of the sprockets 23 is a braking and driving unit, generally indicated at 28, and operatively interposed between the drive shaft and the other sprocket is a similar braking and driving unit 29. As these units are identical a description of one will be sufficient. Each of the units comprises an elongated sleeve 30 rotatably mounted on an end of the shaft 24 on bushings 31, the outer end of the sleeve being closed by a welch plug 32, Fig. 1. At its outer end, the sleeve 30 has one of the sprockets rigidly secured thereto or formed thereon, while at its inner end the sleeve is formed with a pair of axially spaced radially projecting flanges 33 and 34. Projecting axially inwardly from the face of the inner flange 33 are two pairs of clutch jaws or teeth 35.

Extending radially outwardly from the inner sleeve flange 33 at one side of the sleeve is a flat ear 36 with a tangentially extending slot 37, Figs. 3 and 8, to receive brake mounting and adjusting means hereinafter described, and extending radially outwardly from the sleeve flanges 33 and 34 at the other side of the sleeve are a pair of axially spaced ears 38, Figs. 5 and 8, provided with split bushings 39 and bearing caps 40 which are secured by screws 41, rotative shifting of the bushings being prevented by interposed plates 42 clamped by the bearing caps. The bushings 39 have journalled therein a brake-releasing member 43 hereinafter more fully described. The sleeve 30 is cut away at 44 between the flanges 33 and 34 to form a spring chamber. Intermediate the flange 34 and the sprocket 23, the sleeve 30 is somewhat reduced in diameter and is journalled in a bearing member 45 of the lower frame 20.

Disposed concentrically with the shaft 24 and sleeve 30 in the plane of the inner flanged end of the sleeve is an annular non-rotatable metallic brake drum or ring 46 having a cylindrical inner braking face 47. The brake drum is rigidly secured to the lower frame 20, as by a pair of opposite outwardly projecting ears 48 on the drum secured to the frame by bolts 49.

Cooperating with the brake drum 46 are a pair of opposed metallic brake shoes 50 of approximately semicircular shape carrying respective arcuate friction linings 51 which are secured as hereinafter described. The brake shoes are of identical construction, each having an arcuate head or band portion 52 and an inner radial reinforcing flange 53, the intermediate portion of the shoe having a generally T-shaped cross-section as seen in Fig. 6. At one end, each shoe has a bushed eye 54 pivotally carried on one of a pair of mounting bolts 55 which extend through the slotted ear 36 and are parallel to the axis of the shaft 24, the adjacent end of the other shoe being similarly carried on the second mounting bolt 55. The bolts 55 are rigidly but adjustably secured to the slotted ear 36 of the sleeve 30, as hereinafter described. The pivot eye 54 of each brake shoe is axially confined on the companion bolt 55 between an eccentric collar 56 formed on an intermediate portion of the bolt and a nut 57 on an end of the bolt. The other end portion of the bolt passes through an eccentric bushing 58 which is rotatably and slidably fitted in the slot 37 and is secured in adjusted position by a locking nut 59 on the bolt, the eccentric collar 56 being clamped against one face of the slotted supporting ear 36, and a flange 60 of the bushing 58 being clamped against the opposite face of the slotted ear. To facilitate adjustment, each bushing flange 60 is hexagonal and each bolt 55 has a squared end 61. The eccentric collars 56 are in abutment at their peripheries, thus determining the lateral spacing of the axes of the bolts 55.

Near their other ends the brake shoes have aligned sockets 62 for receiving the opposite ends of a compressed coiled spring 63 extending transversely of the shaft 24 and disposed in the sleeve chamber 44, this spring serving to urge the brake shoes against the brake drum 46.

The brake-releasing member 43 comprises a shaft journalled in the bushing 39 and provided with axially spaced pairs of arms 64 between the bushed ears 38, the arms in each pair projecting in opposite directions. A pair of pins 65 are secured in the arms 64, as by rivets 66, and extend in parallel relation to the shaft 43 and at opposite sides of the shaft. Link blocks 67 have ends pivotally mounted on the respective pins 65 and are axially confined between the arms 64. The other end of each link block 67 has a transverse slot 68 in the plane of the block. Pins 69 are secured to laterally spaced terminal ears 70 on the respective brake shoes 50 and extend through the slots 68 of the respective link blocks, thus forming lost motion connections and also laterally confining the brake shoes. The brake-releasing shaft 43 has an annular flange 71 at its outer end and a head 72 at its inner end, the head having formed thereon a sector gear 73 and having formed therethrough a transverse bore 74 intersecting the shaft axis.

Means are provided for driving the sprocket sleeve 30 and for releasing the brake mechanism with the application of power to the sleeve. This means comprises a sleeve 75 fixed on the shaft 24 adjacent to the sleeve 30, as by a key 76 and screw 77. At the end distant from the sleeve 30, the sleeve 75 is formed with a radial flange 78, Figs. 1 and 2, having driving clutch jaws or teeth 79. Surrounding the sleeve 75 for relative rotatable and axial movement is a bushed compound clutch member 80 having clutch jaws or teeth 81 at one end for releasable interengagement with the clutch jaws 79 and having a pair of diametrically opposite clutch jaws 82 at the other end received between the clutch teeth or jaws 35 of the sleeve 30. The length of the jaws 82 is such that they remain meshed in all axial positions of the clutch member 80. However, as seen in Figs. 3 and 4, the jaws 82 are considerably narrower than the spaces between the jaws 35 so as to provide considerable angular lost motion between the sleeves 30 and 75 even though the jaws are meshed. This lost motion is utilized to release the brake prior to engagement of the clutch jaws 81 with the jaws 79, so that at the time power is transmitted to the sleeve 30 the brake mechanism is disengaged and the sleeve 30 free to rotate. For this purpose, the clutch member 80 has gear teeth 83 meshing with the sector gear 73 on the head 72 of the brake-releasing shaft 43.

The spring 63 in applying the brake rotates the shaft 43 through the links 67 to the position shown in Fig. 3, the lost motion connections in the links insuring proper braking pressure even after wear of the brake linings has occurred. Through the gearing connections 73, 83, the shaft 43 will return the clutch member 80 to a normal or neutral position wherein the jaws 82 are positioned midway between adjacent jaws 35, as seen in Fig. 3. Upon engagement of the jaws 79 and 81, and resultant rotation of the sleeve-like clutch member 80, the shaft 43 will first be rocked by the gearing connections 73, 83, and thus draw the brake shoes together to release the brake mechanism, the brake shoes pivoting on the bolts 55. By the time the jaws 82 engage the sprocket sleeve jaws 35, the brake mechanism will be fully released and the parts will be in the position shown in Fig. 4, which shows the parts when the clutch member 80 is rotated in a clockwise direction. Rotation in a counterclockwise direction will similarly release the brake, the clutch jaws 82 then engaging the other pair of sprocket sleeve jaws 35.

To provide for engagement or disengagement of the sleeve-like member 80 with the drive shaft 24, so that the crawler associated with the particular braking and driving unit may be driven or held stationary, the clutch member is provided with an annular groove 84 engaged by parts of a shifting fork 85 rockably mounted on a supporting pin 86, Fig. 2, the fork having an arm 87 with a ball and socket connection 88 to a shifting rod 89. As in the above Patent 2,318,286, the shifting forks for the units 28 and 29 are connected by suitable linkage to be simultaneously actuated by the operator through a single control lever, not shown, this linkage including a vertical control rod 90 passing through the shaft 27, and a multiple-armed rock lever 91 the opposite ends of which are connected to the shifting rods 89. Each rod 89 has a slidable lost motion connection with the shifting fork arms 87, this connection including a compressed coiled spring 92 through which is transmitted movement of the fork in clutching direction. When the rock lever 91 is in intermediate position both units 28 and 29 are in driving position, and when the rock lever is swung in either direction from intermediate position the corresponding unit is placed out of driving position, as seen in Figs. 2 and 4, the other unit remaining in driving position. In Fig. 1, the right-hand unit 28 is in driving positon and the left-hand unit 29 is out of driving position.

Replacement of conventionally secured brake linings in the type of machine disclosed in the above Patent 2,318,286 has heretofore necessitated considerable dismantling of the mechanism, and one of the purposes of the present invention is to facilitate the replacement of such linings. Each brake shoe 50 has formed through its band portion 52 a number of radial bores 93, there being a series of these bores near each side of the band. The lining 51 is provided with registering radial bores 94 of the same diameter, the outer end of each bore having a cylindrical counterbore 95 forming an annular seat 96. A cylindrical nut 97 of brass or other soft metal fits snugly in each lining bore 94 and in the associated shoe bore 93 and has an annular clamping flange 98 at its outer end fitting in the counterbore 95 and engaging the seat 96, the edge of the flange being preferably serrated or milled to engage the walls of the counterbore. The axial dimension of the nut is not substantially greater than the normal thickness of the lining and preferably slightly shorter. The nut is held firmly in clamping position by a cap screw 99, preferably of brass or other soft metal, the screw head bearing on a washer 100 engaging the inner side of the brake shoe band 52, as seen in the left-hand part of Fig. 6. The nuts 97, fitting snugly in the bores 93 and 94, resist lateral shifting of the linings in all directions.

When the linings of each braking unit become so worn as to require replacement, the brake shoes are released from the brake drum, this preferably being accomplished by inserting an end of a suitable pry bar or tool 101, Fig. 5, in the transverse bore 74 of the brake-releasing shaft 43, turning the shaft by the bar (or by momentary application of power) to retract the shoes, and holding the bar in deflected position, as by engaging the other end of the bar with the ground. The screws 99 on each brake shoe are then loosened and while still engaged in the nuts are tapped to drive the associated nuts outwardly to the position shown at the right-hand portion of Fig. 6, the inner end of the nut clearing the brake shoe. The screws are then detached, and with the nuts in the position shown in the right-hand portion of Fig. 6, the lining is removed by sliding it laterally off the shoe at the side toward the clutch member 82. A new lining, with the nuts inserted to lie approximately flush with the lining, is installed by slipping it in the space between the drum and the brake shoe, and then pulling the nuts into the brake shoe bores 93 by screwing the cap screws 99 firmly into the nuts. When installing new linings the pivot bolts 55 for the brake shoes are adjusted to permit insertion of the linings and to effect proper adjustment of the linings with respect to the drum. The eccentrics 56 of the pivot bolts determine the spacing of the bolt axes, and the eccentric bushings 59 serve to vary the position of the pivot bolts in a radial direction with respect to the drive shaft 24. After lining wear occurs, the pivot bolts may require readjustment.

It will be seen that the brake linings are firmly held on the brake shoes, but can be easily and quickly replaced when they become worn. Furthermore, it is not necessary to dismantle the mechanism when replacing the linings. The brake shoes can be easily and accurately adjusted, and the brake-releasing means functions smoothly and reliably and with a minimum of wear.

The lined brake shoe construction is disclosed and claimed in applicant's divisional application for Brake Shoe Construction, Serial No. 102,807, filed July 2, 1949.

What I claim as new and desire to secure by Letters Patent is:

1. In a friction device, an outer member having an inner cylindrical friction face, a carrier, a pair of opposed friction shoes movably mounted on said carrier and arranged within said outer member, said outer member and said shoe carrier being relatively rotatable, there being respective spaces between said shoes and said friction face, arcuate friction linings laterally insertible into said spaces and laterally removable therefrom, said linings being normally carried by said respective shoes and adapted to engage said friction face, detachable securing means for anchoring said linings to said shoes, spring means for normally urging the lined shoes against said friction face, and means for releasing said shoes including a rock shaft having a tool-engaging abutment for holding said shoes in released position to permit lateral insertion and withdrawal of said linings into and out of said spaces.

2. In a friction device, an outer member having an inner cylindrical friction face, a carrier, a pair of opposed friction shoes movably mounted on said carrier and arranged within said outer member, said outer member and said shoe carrier being relatively rotatable, there being respective spaces between said shoes and said friction face, arcuate friction linings laterally insertible into said spaces and laterally removable therefrom, said linings being normally carried by said respective shoes and adapted to engage said friction face, detachable securing means for anchoring said linings to said shoes, means for normally urging the lined shoes against said friction face, and means for releasing said shoes including a rock shaft having a transverse tool-receiving bore for holding said shoes in released position to permit lateral insertion and withdrawal of said linings into and out of said spaces.

3. In a friction device, an outer member having an inner cylindrical friction face, a shoe carrier relatively rotatable with respect to said outer member, a pair of opposed friction shoes arranged within said outer member and having adjacent ends pivotally mounted on said carrier, replaceable friction linings detachably secured on said shoes and engageable with said friction face, spring means for urging said lined shoes against said friction face, a shoe-releasing rock shaft journalled in said carrier adjacent to the other ends of said shoes, links connecting said rock shaft and said last-named shoe ends and having lost motion connections with said last-named shoe ends, and actuating means for said rock shaft, said rock shaft further having a transverse tool-receiving opening for effecting rotation of said rock shaft in shoe-releasing direction to facilitate replacement of said linings.

4. In a friction device, a drum having a cylindrical inner friction face, a carrier relatively rotatable with respect to said drum and having a slot extending in a generally tangential direction, a pair of friction shoes having arcuate faces engageable with the friction face of said drum, a pair of angularly adjustable pivot members extending through said slot in parallel relation to the carrier axis for pivotally mounting adjacent ends of said shoes, said pivot members both being shiftable along said slot and having respective eccentric portions engageable with each other for determining the lateral spacing of the axes of said members, securing means for locking said pivot members on said carrier, and means for angularly moving said shoes on said pivot members.

5. In a friction device, a drum having a cylindrical inner friction face, a carrier relatively rotatable with respect to said drum and having a slot extending in a generally tangential direction, a pair of friction shoes having arcuate faces engageable with the friction face of said drum, a pair of angularly adjustable pivot members extending through said slot in parallel relation to the carrier axis for pivotally mounting adjacent ends of said shoes, said pivot members both being shiftable along said slot and having respective eccentric portions engageable with each other for determining the lateral spacing of the axes of said members, securing means for locking said pivot members on said carrier, angularly adjustable eccentric bushings receiving said respective pivot members and rotatably fitting in said slot for shifting said pivot members in a generally radial direction with respect to said drum, and means for angularly moving said shoes on said pivot members.

6. In a friction device, a drum having an inner friction face, a carrier relatively rotatable with respect to said drum and having a slot extending in a generally tangential direction, a friction shoe engageable with said friction face, an angularly adjustable pivot member for said shoe extending through said slot in parallel relation to the carrier axis, an abutment on said carrier, said pivot member having an eccentric portion engageable with said abutment, securing means for locking said pivot member on said carrier, an angularly adjustable eccentric bushing receiving said pivot member and rotatably fitting in said slot for shifting said pivot member in a generally radial direction with respect to said drum, and means for swinging said shoe on said pivot member.

7. In a friction device, an outer member having an inner friction face, a shoe carrier relatively rotatable with respect to said outer member, a pair of opposed friction shoes arranged within said outer member and having adjacent ends pivotally mounted on said carrier, spring means for normally urging said shoes against said friction face, a shoe-releasing rock shaft pivotally mounted on said carrier adjacent to the other ends of said shoes, links forming lost motion connections between said rock shaft and said last named shoe ends, and actuating means for said rock shaft.

HILBERT E. SWANSON.

References Cited in the file of this patent

UNITED STATES PATENTS

| Number | Name | Date |
|---|---|---|
| 1,188,098 | Phillips | June 20, 1916 |
| 1,537,234 | Hartman et al. | May 12, 1925 |
| 1,671,759 | Bendix | May 29, 1928 |
| 1,806,683 | Roberts | May 26, 1931 |
| 1,824,150 | Howe | Sept. 22, 1931 |
| 1,860,959 | Schnell | May 31, 1932 |
| 1,885,174 | Bowen et al. | Nov. 1, 1932 |
| 1,902,647 | La Brie | Mar. 21, 1933 |
| 2,016,280 | Gatke | Oct. 8, 1935 |
| 2,037,455 | Bowen | Apr. 14, 1936 |
| 2,051,400 | Taylor | Aug. 18, 1936 |
| 2,068,073 | Rader | Jan. 19, 1937 |
| 2,071,297 | Dodge et al. | Feb. 16, 1937 |
| 2,134,512 | Hall | Oct. 25, 1938 |
| 2,139,409 | Hunter | Dec. 6, 1938 |
| 2,206,657 | Boldt | July 2, 1940 |
| 2,241,728 | Loweke | May 13, 1941 |

FOREIGN PATENTS

| Number | Country | Date |
|---|---|---|
| 11,038 | Great Britain | 1905 |
| 541,310 | Great Britain | Nov. 21, 1941 |
| 170,382 | Germany | May 9, 1906 |
| 661,916 | Germany | June 30, 1938 |